United States Patent [19]

Arenhold

[11] 4,273,349
[45] Jun. 16, 1981

[54] MUD FLAP

[76] Inventor: Knut Arenhold, Westend 7, 2000 Hamburg 52, Fed. Rep. of Germany

[21] Appl. No.: 57,681

[22] Filed: Jul. 16, 1979

[30] Foreign Application Priority Data

Jan. 24, 1979 [DE] Fed. Rep. of Germany ....... 2906545

[51] Int. Cl.³ ............................................ B62D 25/16
[52] U.S. Cl. ............................................ 280/154.5 R
[58] Field of Search ............ 280/154.5 R, 154, 153 R, 280/152 R, 153 A, 164 R, 163; 296/198, 194, 203, 204, 15, 199, 195; 180/89.1

[56] References Cited

U.S. PATENT DOCUMENTS 4,089,537   5/1978   Pralotsky ...................... 280/154.5 R
4,103,918   8/1978   Salden ........................... 280/154.5 R

FOREIGN PATENT DOCUMENTS 1205076   9/1970   United Kingdom ............. 280/154.5 R

*Primary Examiner*—David M. Mitchell

[57] ABSTRACT

There is provided a flexible mud flap for securing to a fender of a vehicle comprising a main body portion with lower inside, outside and upper edges. An additional body portion is disposed above the main body portion and has a generally parabolically curved edge such that the vertex of the parabola lies on the upper edge of the main body portion and the distance between the vertex and the inside edge of the main body portion is approximately 0.3 to 0.4 of the distance between the inside and outside edges of the main body portion. The thus provided shape of the mud flap is universally securable to modern fenders, both back and rear fenders, while at the same time avoiding uncovered portions of the fender which will allow mud to be passed therethrough.

5 Claims, 1 Drawing Figure

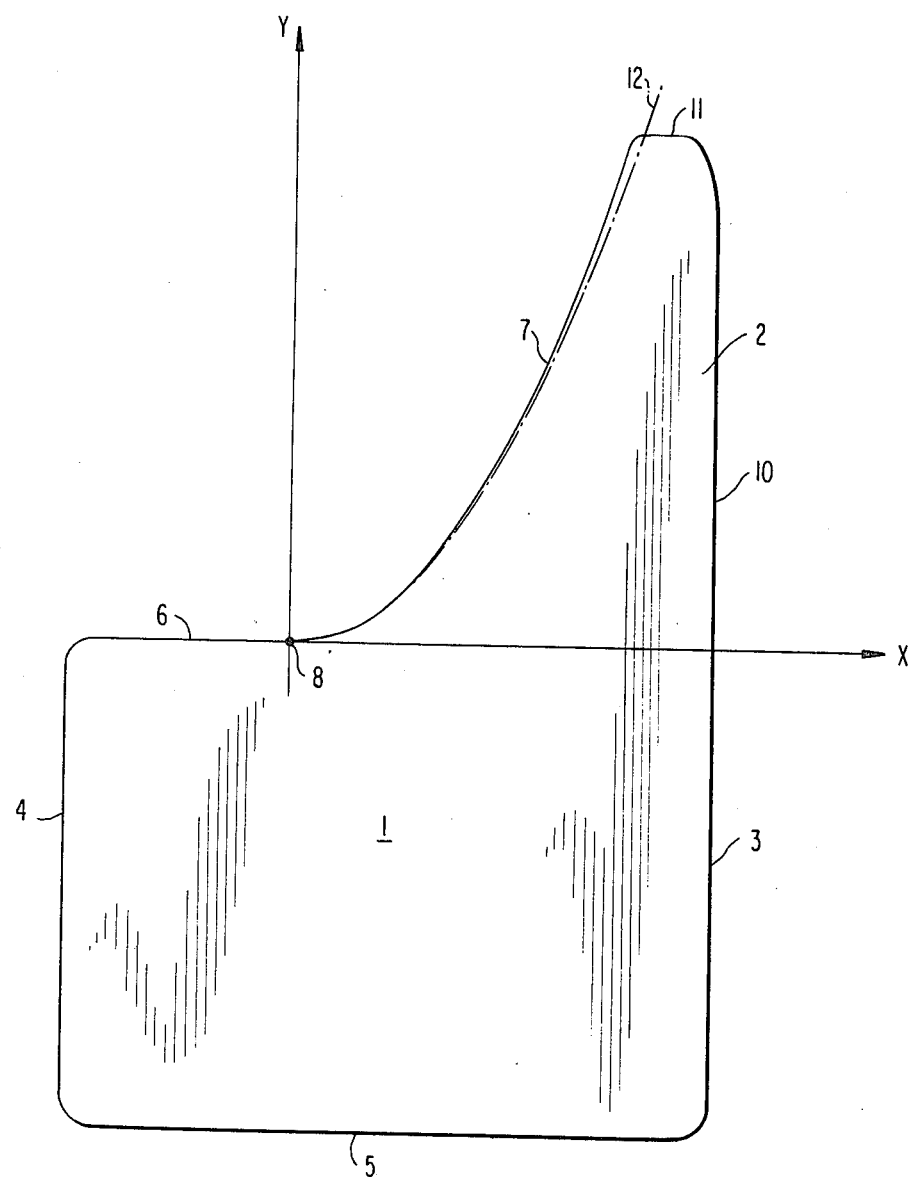

MUD FLAP

The present invention relates to mud flaps for vehicles, e.g., conventional motor vehicles, and more particularly to such mud flaps which can be universally applied to modern curved fenders, both back and front fenders.

BACKGROUND OF THE INVENTION

With the advent of modern automobiles having curved fenders, difficulties have been encountered in adapting conventional mud flaps to those fenders. Particularly, conventionally available mud flaps do not fit both the rear and front fenders, mainly because the fender welts are shaped differently and require that the mud flaps be fastened to various higher points along the fender and fender welts, if they can be fastened at all. Even when fastenable, the various higher fastening points result in a shift of the mud flap to one side due to the curved shape of the fenders. This results in the mud flap body not covering the entire wheel area located more to the inside of the vehicle, or alternatively, the mud flap outside edge does not project far enough to the outside of the fender to intercept mud being slung from the tires. Additionally, another difficulty which is due to the differing high location of the fastening points is that the mud flaps do not completely cover the area of the fender near the upper edge of the mud flap. Thus, in that particular area, a "hole" is visible from the outside between the vehicle body fender and the mud flap. Conversely, the mud flap's upper edge will be situated so far up in that area that it comes into contact with parts of the vehicle fender located in that area. In such case, fastening of the mud flap to the fender is difficult, if fastenable at all.

OBJECTS OF THE INVENTION

Therefore it is an object of the invention to provide a mud flap which generally can be attached to all passenger vehicles presently on the market and which nonetheless covers the entire wheel width. It is a further object of the invention to provide such a mud flap which projects far enough to the outside of the vehicle body to avoid soiling of the outer vehicle body portion by mud being slung from the tires. It is a further object of the invention to provide an esthetic appearance of the mud flap while at the same time no "holes" are visible when the mud flap is in place. Finally, it is an object of the invention to provide a mud flap which is easily secured to conventional fenders, both rear and front fenders.

BRIEF DESCRIPTION OF THE DRAWING

The FIGURE is a elevational view of a preferred embodiment of the mud flap of the present invention.

BRIEF DESCRIPTION OF THE INVENTION

The invention is based on the discovery that a certain shape of the upper portion of a mud flap will provide easy attachment of the mud flap to both front and rear fenders, while at the same time covering essentially the entire wheel area and leaving no "holes" which are visible from outside of the vehicle. Thus, the invention provides a flexible mud flap for securing to the fender of the vehicle comprising a main body portion having a generally horizontally disposed lower edge, generally vertically disposed inside and outside edges, and a generally horizontally disposed upper edge. An additional body portion is disposed generally vertically above the main body portion and has a generally parabolically curved inner edge, such that the vertex of the parabola lies on the upper edge of the main body portion. The distance between the vertex and the inside edge of the main body portion is approximately 0.3 to 0.4 the distance between the inside and outside edges of the main body portion, and the half parameter of the parabola (distance between directrix and focus of parabola) being between $p=3.5$ and $p=4.0$ centimeters (cm). Thus, the mud flap is securable to curved fenders in an easy manner, and will cover essentially the entire wheel area and leave no visible "holes".

DETAILED DESCRIPTION OF THE INVENTION

The mud flap is made of any suitable flexible material, such as plastic, rubber, and the like. The mud flap is attachable to the fender welt of a vehicle in the conventional manner, i.e., fastening clamps, for example U-shaped fastening clamps, which grip the fender welt and the flap area.

The invention may be best understood by reference to the FIGURE, which is a preferred embodiment of the invention. Thus, the mud flap, shown in the drawing, has a main body portion 1 and an additional body portion, generally 2. Additional body portion 2 is disposed generally vertically above the main body portion. As shown in the FIGURE, the main body portion 1 has an outside edge 3, and an inside edge 4, both of which are generally vertically disposed. The main body portion also has an upper edge 6 which is generally horizontally disposed. Additional body portion 2 has an inside edge 7 which is generally parabolically curved. The vertex 8 of the parabola, which intersects axis Y of the parabola, lies on the upper edge of the main body portion.

The shapes of outer edge 10 and upper edge 11 of the additional body portion are not critical and may be in an desired esthetic shape. However, preferably, outer edge 10 is simply a continuation of outside edge 3 of main body portion 1, as shown in the drawing, and upper edge 11 is simply a convenient rounded shape for intersecting inner edge 7 and outer edge 10. Indeed, it is not necessary for all of edges 3, 4, 5, 6, 10, and 11 to have straight edges, as shown in the drawing, and curvatures or other designs can be used in these edges. However, substantial curvatures which go inwardly toward the mud flap can leave "holes" and curvatures which extend outwardly of the mud flap, simply increase the size of the mud flap without adding substantial additional function thereto. Accordingly, the straight edges, as shown in the drawings, are preferred.

Turning now to the details of the shape of the inside edge 7, that shape is generally in the configuration of a parabola, the half parameter of which is between $p=3.5$ and $p=4.0$ cm, with the preferred value being $p=3.8$ cm. This latter value, i.e., $p=3.8$ cm, is illustrated by the dashed/dotted line 12. It has been surprisingly discovered that when the inside edge 7 of the mud flap has a parabolic shape of such dimensions, the mud flap is suitable for practically all passenger vehicles presently on the makret. Thus, the mud flap is a "universal" mud flap in that it is adaptable to nearly all passenger vehicles, while at the same time avoiding the difficulties explained above.

However, in addition to the shape of inside edge 7, it has also been discovered that a rather specific relationship must exist between the width of the main body portion and the additional body portion. Such relationship places the parabola at the correct position on the upper edge of the main body portion, so that the mud flap may function in the manner described above. Thus, while the vertex 8 of the parabola (as defined by axes Y and X) lies on upper edge 6 of the main body portion, that vertex must also be so positioned that the distance between the vertex 8 and the inside edge 4 of the main body portion is approximately 0.3 to 0.4 of the distance between the inside and outside edges of the main body portions, preferably that distane relationship is 0.35.

Finally, it will be noted from the drawing that the parabola shape of inner edge 7 is such that the X axis of the parabola is along the upper edge 6 of the main body portion. This orients the parabola in the correct configuration.

Preferably, the distance between the inside and outside edges of the main body portion is between 20 and 23 cm, especially about 21.5 cm. The height of the main body portion is between 15 and 18 cm, especially 16 cm. The height of the additional body portion is also between 15 and 18 cm, especially approximately 17 cm.

Having thus described the invention, it can be appreciated that the objects of the invention have been obtained and the invention extends to the spirit and scope of the annexed claims.

What is claimed is:

1. A flexible mud flap for securing to the fender of a vehicle, comprising:
   (1) a main body portion having a generally horizontally disposed lower edge, generally vertically disposed inside and outside edges, and a generally horizontally disposed upper edge;
   (2) an additional body portion disposed generally vertically above the main body portion and having a generally parabolically curved inner edge such that the vertex of the parabola lies on the upper edge of the main body portion and the distance between the vertex and the inside edge of the main body portion is approximately 0.3 to 0.4 of the distance between the inside and outside edges of the main body portion, the half parameter of the parabola being between $p=3.5$ and $p=4.0$ centimeters, and said curved inner edge adapted to be attached to the fender welt;
   whereby the mud flap is securable to curved fenders.

2. The mud flap of claim 1 wherein the distance between the inside and outside edges of the main body portion is between 20 and 23 cm.

3. The mud flap of claim 1 wherein the height of the additional body portion is at least 12 cm.

4. The mud flap of claim 3 wherein the height of the additional body portion is from 15 cm to 18 cm.

5. The mud flap of claim 1 wherein the height of the main body portion is from 15 cm to 18 cm.

* * * * *